J. T. ARNOLD & W. D. WILCOX.
Improvement in Socket Wrenches.
No. 132,516
Patented Oct. 29, 1872.
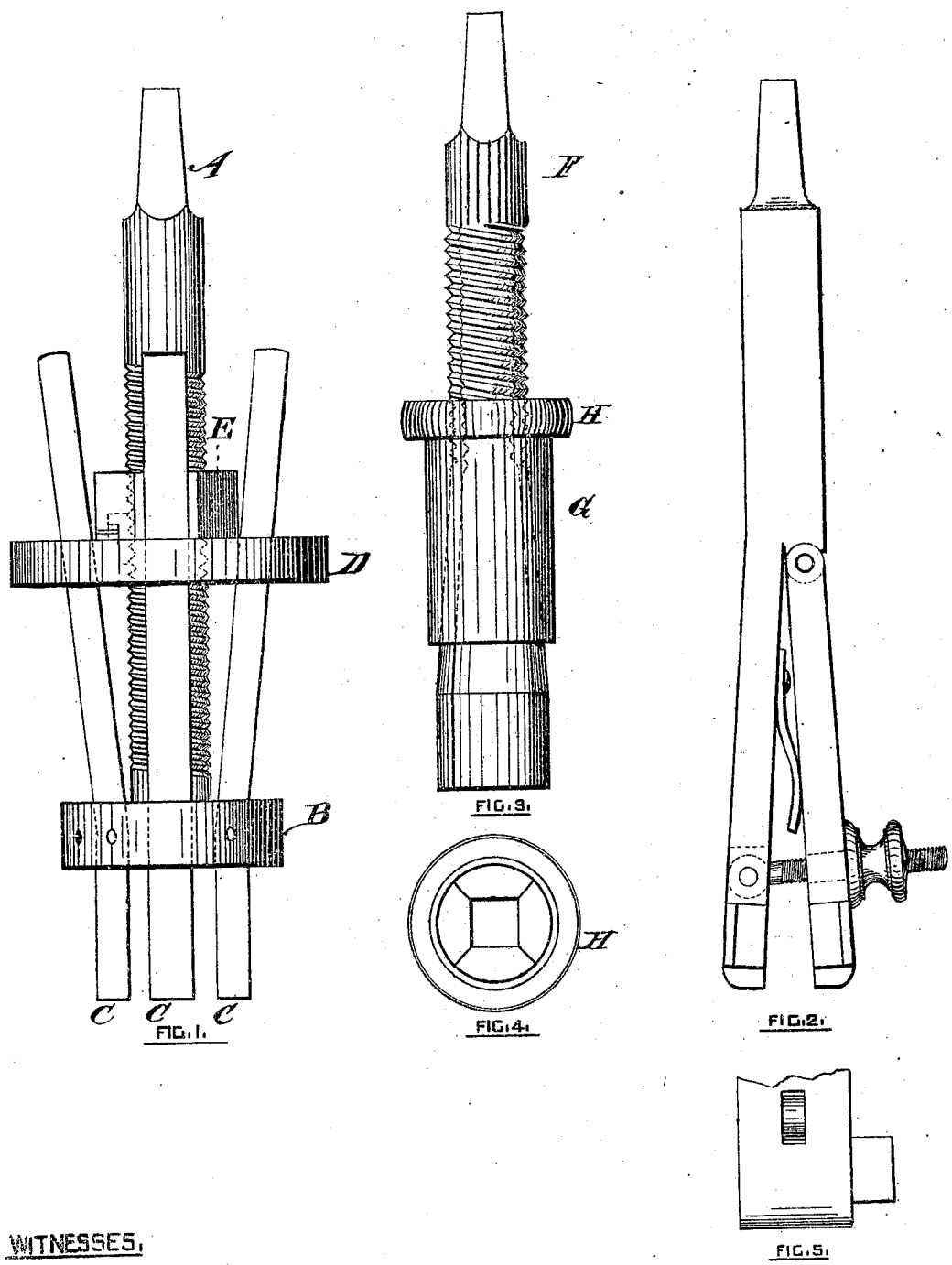

UNITED STATES PATENT OFFICE.

JOHN T. ARNOLD AND WILSON D. WILCOX, OF WARWICK, RHODE ISLAND.

IMPROVEMENT IN SOCKET-WRENCHES.

Specification forming part of Letters Patent No. 132,516, dated October 29, 1872.

*To all whom it may concern:*

Be it known that we, JOHN T. ARNOLD and WILSON D. WILCOX, both of Warwick, in the county of Kent and State of Rhode Island, have invented a new and improved Socket-Wrench; and we do hereby declare that the following specification, taken in connection with the drawing making a part of the same, is a full, clear, and exact description thereof.

Figure 1 is a view of our improved wrench. Fig. 3 is a modification of the same.

The object of our invention is to produce a wrench which for strength and facility of adjustment shall be superior to anything now in use, and consists of the device hereinafter described. Our invention is particularly adapted to use in connection with a "bit-stock," although it may be used in other ways, and is what is commonly and properly called a "socket-wrench."

It consists of a short rod, A, its upper end being squared to fit a socket, and having a screw cut thereon the greater portion of its length. To the lower end of the rod A is attached a circular disk, B, of suitable thickness, through which project the lower ends of four levers C C C C, which are pivoted to said disk and extend upward at a slight angle, passing through another circular disk, D. The circular disk D is attached to and held in place by the nut E, which is fitted to the screw upon the rod A and turns independently of the disk D.

The operation of our invention is as follows: The upper end having been inserted in the socket, the whole is placed over the nut in such a manner that the lower ends of one of the levers C will be upon each side of the nut which it is desired to turn. The nut E is then turned down, thus depressing the disk D, which spreads the upper ends of the levers C and closes the lower ends around the nut, which is thus securely held. After the nut has been turned up the wrench may be detached by turning the nut E in the opposite direction, which raises the disk D and opens the lower ends of the levers C.

The same principle may be carried out by a somewhat different construction, as shown in Fig. 3, which consists in making the lower end of the rod F of greater diameter—that is to say, slightly tapering toward the screw. The end of the said rod F is also divided perpendicularly into sections, and provided with a socket, as shown in Fig. 4. The socket is placed over and made to fit the nut by bringing together the different sections thereof, which is done by forcing down the ferrule G by means of the nut H.

What we claim as our invention, and desire to secure by Letters Patent, is—

1. A socket-wrench having four levers, C, operated by the disk D and the nut E, or other suitable means, in the manner substantially as described.

2. The combination of the disks B and D and the lever C, the whole constructed, arranged, and operating in the manner substantially as described.

JNO. T. ARNOLD.
W. D. WILCOX.

Witnesses:
WALTER B. VINCENT,
NATHANIEL L. MORGAN.